United States Patent
Han et al.

(10) Patent No.: US 9,119,223 B2
(45) Date of Patent: Aug. 25, 2015

(54) TWO ANTENNAS IN CLOSE PROXIMITY WITH SIGNAL ISOLATION

(71) Applicant: Futurewei Technologies, Inc., Plano, TX (US)

(72) Inventors: Chulmin Han, San Diego, CA (US); Xiaomeng Su, San Diego, CA (US)

(73) Assignee: Futurewei Technologies, Inc., Plano, TX (US)

( * ) Notice: Subject to any disclaimer, the term of this patent is extended or adjusted under 35 U.S.C. 154(b) by 312 days.

(21) Appl. No.: 13/706,486

(22) Filed: Dec. 6, 2012

(65) Prior Publication Data

US 2014/0162719 A1 Jun. 12, 2014

(51) Int. Cl.
| | |
|---|---|
| *H01Q 1/24* | (2006.01) |
| *H04W 88/06* | (2009.01) |
| *H01Q 1/48* | (2006.01) |
| *H01Q 1/52* | (2006.01) |
| *H01Q 9/42* | (2006.01) |

(52) U.S. Cl.
CPC ............... *H04W 88/06* (2013.01); *H01Q 1/243* (2013.01); *H01Q 1/48* (2013.01); *H01Q 1/521* (2013.01); *H01Q 9/42* (2013.01)

(58) Field of Classification Search
CPC ......... H01Q 1/243; H01Q 1/48; H01Q 1/521; H01Q 9/42
USPC .................................. 343/702, 700 MS, 848
See application file for complete search history.

(56) References Cited

U.S. PATENT DOCUMENTS 6,801,170 B2 * 10/2004 Forrester et al. .............. 343/702

FOREIGN PATENT DOCUMENTS

| CN | 1588695 A | 3/2005 |
|---|---|---|
| CN | 200976584 Y | 11/2007 |
| CN | 102214856 A | 10/2011 |
| CN | 102576932 A | 7/2012 |
| EP | 1451895 A1 | 9/2004 |
| WO | 03047025 A1 | 6/2003 |

OTHER PUBLICATIONS

"IEEE Standard for Information Technology—Telecommunications and Information Exchange Between Systems—Local and Metropolitan Area Networks—Specific Requirements, Part 11: Wireless LAN Medium Access Control (MAC) and Physical Layer (PHY) Specifications," IEEE 802.11™—2007, Jun. 12, 2007, 1232 pages.

"IEEE Recommended Practice for Local and Metropolitan Area Networks, Coexistence of Fixed Broadband Wireless Access Systems," IEEE Computer Society and the IEEE Microwave Theory and Techniques Society, IEEE 802.16.2™—2004, Mar. 17, 2004, 171 pages.

(Continued)

*Primary Examiner* — Hoang V Nguyen
(74) *Attorney, Agent, or Firm* — Conley Rose, P.C.; Grant Rodolph; William H. Dietrich (57) ABSTRACT

Included is a mobile node (MN) comprising a first antenna configured to communicate with a wireless network, a second antenna configured to communicate with a wireless network, a first data line coupled to the first antenna, a second data line coupled to the second antenna, and a common ground trace coupled to the first data line and the second data line, wherein the first antenna and the second antenna are not directly connected to the common ground.

25 Claims, 9 Drawing Sheets

(56) References Cited

OTHER PUBLICATIONS

Park, Jungsik, et al., "Ground Slot with Capacitor for High Isolation Between MIMO Antenna," 11th Mediterranean Microwave Symposium (MMS), Sep. 8-10, 2011, pp. 197-200.

Ayatollahi, M., et al., "A Compact, High Isolation and Wide Bandwidth Antenna Array for Long Term Evolution Wireless Devices," IEEE Transactions on Antennas and Propagation, vol. 60, Issue: 10, Oct. 2012, pp. 4960-4963.

Bhatti, Rashid Ahmad, et al., "Compact Antenna Array with Port Decoupling for LTE-Standardized Mobile Phones," IEEE Antennas and Wireless Propagation Letters, vol. 8, 2009, pp. 1430-1433.

Chen, Shin-Chang, et al., "A Decoupling Technique for Increasing the Port Isolation Between Two Strongly Coupled Antennas," IEEE Transactions on Antennas and Propagation, vol. 56, No. 12, Dec. 2008, pp. 3650-3658.

Diallo, A., et al., "Enhanced Two-Antenna Structures for Universal Mobile Telecommunications System Diversity Terminals," IET Microwaves, Antennas & Propagation, vol. 2, Issue: 1, Feb. 2008, pp. 93-101.

Lindberg, Peter, et al., "Technique of Ground Size Tuning for Isolation between Monopoles in Compact Wireless Terminals," IEEE Transactions on Antennas and Propagation, vol. PP, Issue: 99, Jul. 11, 2012, 4 pages.

Foreign Communication From a Counterpart Application, PCT Application PCT/CN2013/088183, International Search Report dated Mar. 6, 2014, 7 pages.

Foreign Communication From a Counterpart Application, PCT Application PCT/CN2013/088183, Written Opinion dated Mar. 6, 2014, 4 pages.

Partial English Translation and Abstract of Chinese Patent Application No. CN001588695A, May 7, 2014, 3 pages.

Partial English Translation and Abstract of Chinese Patent Application No. CN102214856A, May 7, 2014, 4 pages.

Partial English Translation and Abstract of Chinese Patent Application No. CN102576932A, May 7, 2014, 4 pages.

Partial English Translation and Abstract of Chinese Patent Application No. CN200976584, May 7, 2014, 11 pages.

* cited by examiner

TWO ANTENNAS IN CLOSE PROXIMITY WITH SIGNAL ISOLATION

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Mobile nodes (MNs) operating in a telecommunications system may be required to wirelessly transmit and receive multiple types of data substantially simultaneously. MN's may be equipped with a plurality of antennas that may operate as transmitters and/or receivers (or transceivers) to transmit and receive data. The MN's antennas may wirelessly communicate with a network by transmitting and/or receiving data over specified frequencies. Because of MN size constraints, antennas and/or associated data lines may become magnetically coupled to adjacent antennas and/or associated data lines, which may result in poor signal isolation and poor radiation efficiency across various frequencies.

SUMMARY

In one embodiment, the disclosure includes a MN comprising a first antenna configured to communicate with a wireless network, a second antenna configured to communicate with a wireless network, a first data line coupled to the first antenna, a second data line coupled to the second antenna, and a common ground trace coupled to the first data line and the second data line, wherein the first antenna and the second antenna are not directly connected to the common ground.

In another embodiment, the disclosure includes a MN comprising a first antenna configured to communicate with a wireless network, a second antenna configured to communicate with a wireless network, a first data line coupled to the first antenna, a first ground trace coupled to the first data line, a second data line coupled to the second antenna, and a second ground trace coupled to the second data line, wherein a portion of the first ground trace is substantially parallel to a portion of the second ground trace, wherein the ground traces are not electrically shorted, and wherein the parallel portions of the ground traces are separated by a distance of about five millimeters or less.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein is an MN comprising at least two antennas positioned in close proximity that exhibit beneficial signal isolation characteristics during simultaneous communication over a broad range of frequencies commonly employed in wireless networks. Data may be transmitted to and/or received from each antenna via a data line. The data lines for the antennas may not be positioned in a parallel configuration when positioned in close proximity, which may reduce inherent magnetic coupling between the antennas and/or associated components. In an embodiment, magnetic coupling may be further reduced by coupling each data line to a common ground trace. In another embodiment, magnetic coupling may be further reduced by coupling each antenna to a ground line and positioning the ground lines in a substantially parallel configuration with a small intervening distance, such as a range of about five millimeters to about 0.1 millimeters, a range of about five millimeters to about two millimeters, a range of about two millimeters to about 0.5 millimeters, or combinations thereof.

Figure 1:
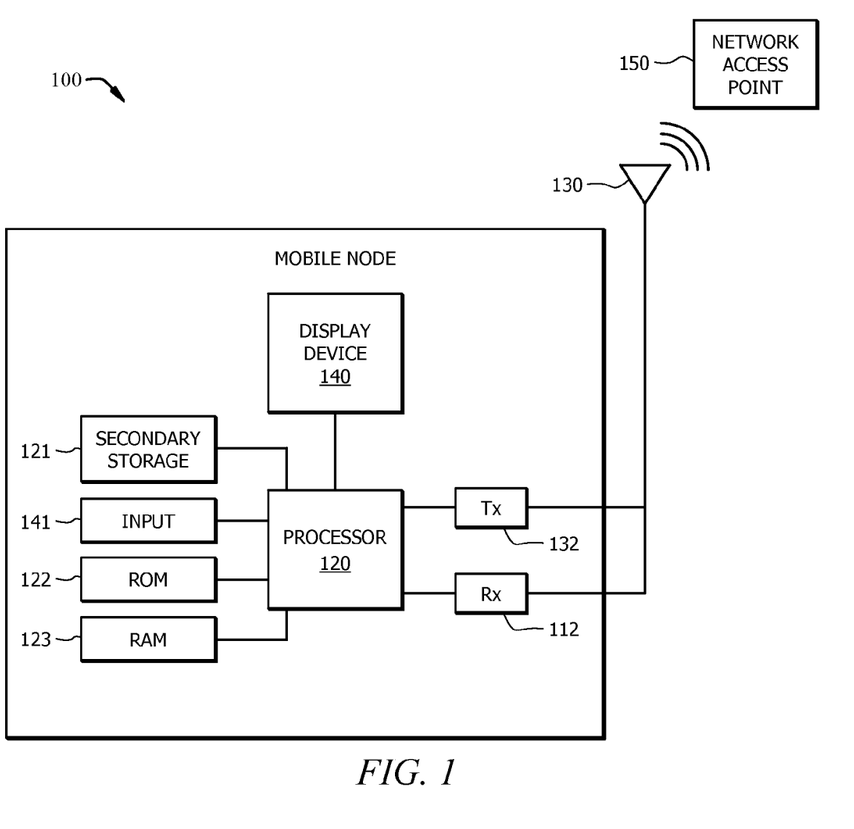
FIG. 1 is a schematic diagram of an embodiment of a MN.

FIG. 1 is a schematic diagram of an embodiment of a MN 100. MN 100 may comprise a two-way wireless communication device having voice and data communication capabilities. In some aspects, voice communication capabilities are optional. The MN 100 generally has the capability to communicate with other computer systems on the Internet. Depending on the exact functionality provided, the MN 100 may be referred to as a data messaging device, a two-way pager, a wireless e-mail device, a cellular telephone with data messaging capabilities, a wireless Internet appliance, a wireless device, a smart phone, a mobile device, and/or a data communication device, as examples.

MN 100 may comprise a processor 120 (which may be referred to as a central processor unit or CPU) that is in communication with memory devices including secondary storage 121, read only memory (ROM) 122, and random access memory (RAM) 123. The processor 120 may be implemented as one or more CPU chips, one or more cores (e.g., a multi-core processor), or may be part of one or more application specific integrated circuits (ASICs) and/or digital signal processors (DSPs). The processor 120 may be configured to implement any of the schemes described herein, and may be implemented using hardware, software, firmware, or combinations thereof.

The secondary storage 121 may be comprised of one or more solid state drives, disk drives, and/or other memory types and is used for non-volatile storage of data and as an over-flow data storage device if RAM 123 is not large enough to hold all working data. Secondary storage 121 may be used to store programs that are loaded into RAM 123 when such programs are selected for execution. The ROM 122 may be used to store instructions and perhaps data that are read during program execution. ROM 122 may be a non-volatile memory device may have a small memory capacity relative to the larger memory capacity of secondary storage 121. The RAM 123 may be used to store volatile data and perhaps to store instructions. Access to both ROM 122 and RAM 123 may be faster than to secondary storage 121.

The MN 100 may communicate data (e.g., packets) wirelessly with a network via a network access point 150. As such, the MN 100 may comprise a receiver (Rx) 112, which may be configured for receiving data (e.g. wireless packets or frames) from other components. The receiver 112 may be coupled to the processor 120, which may be configured to process the data and determine to which components the data is to be sent. The MN 100 may also comprise a transmitter (Tx) 132 coupled to the processor 120 and configured for transmitting data to other components, for example by using protocols such as Institute of Electrical and Electronics Engineers (IEEE) 802.11, IEEE 802.16, 3rd Generation Partnership Project (3GPP), Global System for Mobile Communications (GSM), or similar wireless protocols. The receiver 112 and transmitter 132 may be coupled to a plurality of antennas 130, which may be configured to receive and transmit wireless radio frequency (RF) signals. In some embodiments, Tx 132 and Rx 112 may be replaced by a transceiver comprising the functionality of both Tx 132 and Rx 112.

The MN 100 may also comprise a device display 140 coupled to the processor 120, that displays output thereof to a user. The MN 100 and the device display 140 may configured to display representations of data to a user. The device display 120 may comprise a Color Super Twisted Nematic (CSTN) display, a thin film transistor (TFT) display, a thin film diode (TFD) display, an organic light-emitting diode (OLED) display, an active-matrix OLED display, or any other display screen. The device display 140 may display in color or monochrome and may be equipped with a touch sensor based on resistive and/or capacitive technologies.

Figure 2:
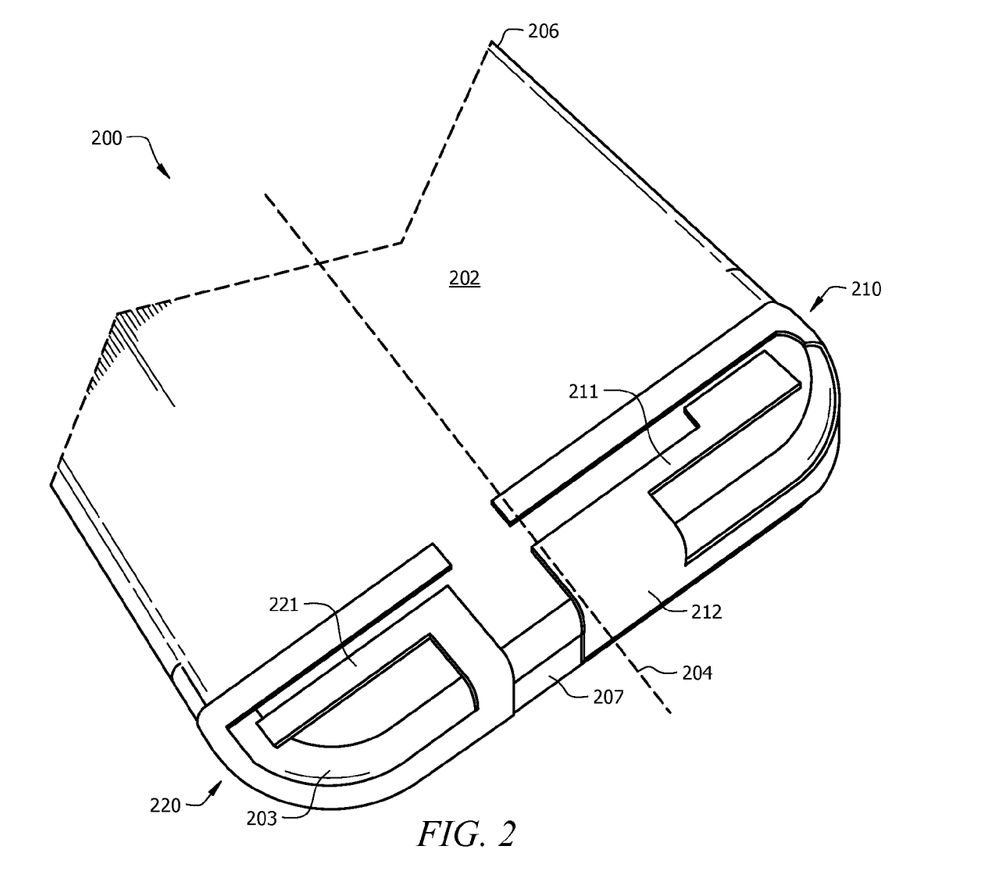
FIGS. 2-4 are schematic diagrams of an embodiment of another MN.
Figure 3:
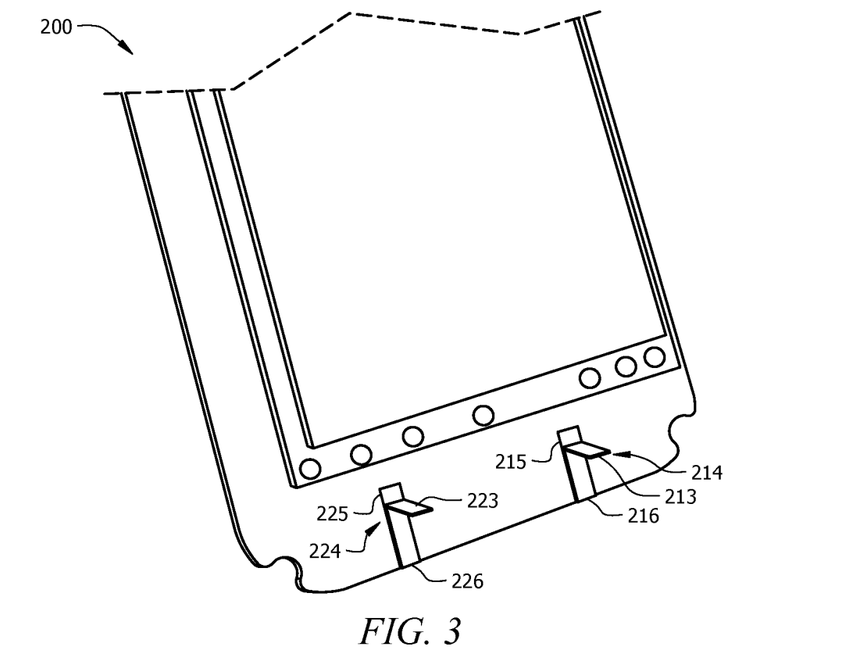
Figure 4:
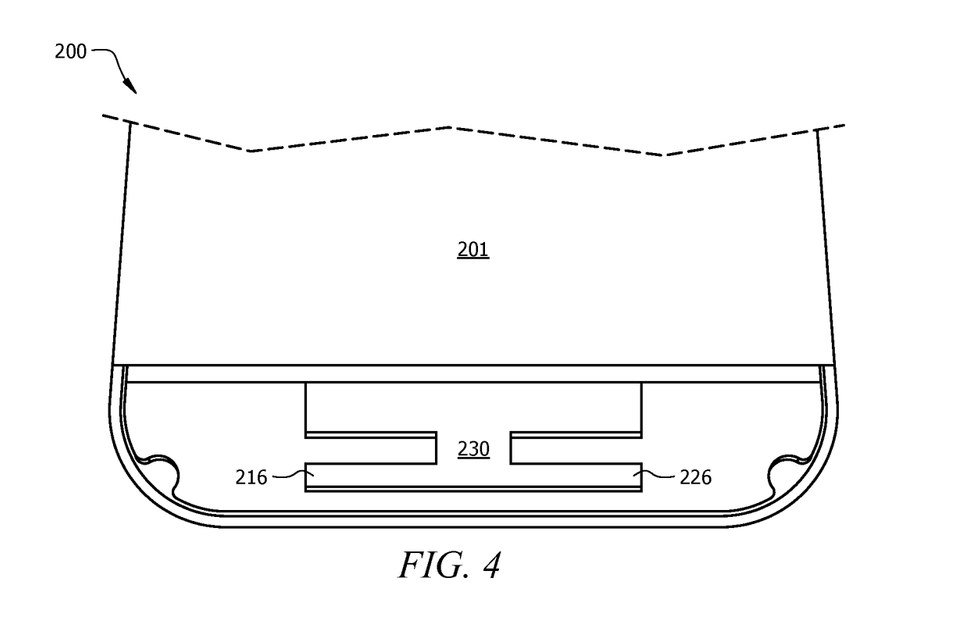

The MN 100 may further comprise an input device 141 coupled to the processor 120, which may allow the user to input commands to the MN 100. In the case that the display device 140 comprises a touch sensor, the display device 140 may also be considered the input device 141. In addition to and/or in the alternative, an input device 141 may comprise a mouse, trackball, built-in keyboard, external keyboard, and/or any other device that a user may employ to interact with the MN 100. FIGS. 2-4 are schematic diagrams of an embodiment of another MN 200. MN 200 may be substantially similar to MN 100, and may comprise a plurality of antennas 210 and 220 placed in close proximity to each other as shown in FIG. 2. MN 200 may also comprise data lines 214 and 224 and ground trace 230 as shown in FIGS. 3 and 4, respectively. The shape and positioning of antennas 210 and 220, data lines 214 and 224, and ground trace 230 may result in beneficial signal isolation characteristics, for example signals passing through antenna 210 may have minimal effect on antenna 220 and associated signals, and vice-versa.

Referring to FIG. 2, which may be a perspective view of MN 200 rear facing, MN 200 may comprise a proximate end 206, a distal end 207, a centerline 204, a rear facing 202, and a front facing 201 (as shown in FIG. 4). The rear facing 202 may comprise an outer edge 203. While distal end 207 is generally the bottom of the MN and proximate end 206 is generally the top of the MN, it should be noted that the terms proximate end 206, a distal end 207, a centerline 204, rear facing 202, and outer edge 203 are used for purposes of clarity and should not be considered limiting. MN 200 may comprise antenna 210 and antenna 220. Antennas 210 and 220 may be positioned on and/or embedded in the distal end 207 of the MN 200. Antennas 210 and 220 may be positioned on the rear facing 202 and/or on the outer edge 203 as shown in FIG. 2. Antennas 210 and 220 may be positioned on and/or adjacent to the centerline 204 as shown in FIG. 2.

Antennas 210 and 220 may comprise connection points 211 and 221, respectively, which may connect to other components (e.g. transceivers via data lines) and may allow electrical current to pass from other MN 200 components to the antennas 210 and 220 and vice-versa. Antennas 210 and 220 may be Planar Inverted F Antennas (PIFAs), monopole antennas, non-monopole antennas, or other antennas. Antenna 210 may be used to transmit and/or receive network data to/from a network, such as a Long Term Evolution (LTE) network, a Simultaneous Voice and LTE (SVLTE) network, and/or an Evolution Data Optimized (EVDO) network. Antenna 210 may transmit/receive signals over multiple frequencies, for example ranges of about 699 megahertz (MHz) to about 2170 MHz, about 699 MHz to about 750 MHz, about 699 MHz to about 746 MHz, about 740 MHz to about 790 MHz, about 816 MHz to about 889 MHz, about 1710 MHz to about 2170 MHz, about 1710 MHz to about 2155 MHz, about 1850 MHz to about 1995 MHz, about 1850 MHz to about 1910 MHz, or combinations thereof. Antennas 210 and 220 may communicate over identical ranges and/or over ranges with frequency overlap, respectively. Antenna 210 may comprise a wide feed trace portion 212 which may allow the antenna 210 to communicate over a broad range of frequencies as discussed above. Antenna 220 may be used to transmit and/or receive voice data to/from a network, such as a Code Division Multiple Access (CDMA) 1 times radio transmission technology (1×) network. Antenna 220 may transmit/receive signals over multiple frequencies, for example ranges of about 820 MHz to about 2170 MHz, about 816 MHz to about 889 MHz, about 820 MHz to about 890 MHz, about 824 MHz to about 889 MHz, about 1710 MHz to about 2170 MHz, about 1710 MHz to about 2155 MHz, about 1850 MHz to about 1990 MHz, or combinations thereof.

Referring to FIG. 3, which may be a perspective view inside of MN 200 rear facing 202, the MN 200 may comprise data lines 214 and 224. Data lines 214 and 224 may each comprise a proximate end 213 and 223, which may be connected to connection points 211 and 221, respectively. Data lines 214 and 224 may further comprise distal ends 215 and 225, which may be connected to associated transmitters, receivers, and/or transceivers positioned inside of MN 200. Data lines 214 and 224 may allow current to flow between antennas 210 and 220, respectively, and the MN's 200 transmitters, receivers, and/or transceivers. MN 200 may further comprise ground traces 216 and 226, which may be connected to the distal ends 215 and 225 of data lines 214 and 224, respectively. Data lines 214 and 224 and ground traces 216 and 226 may be positioned between the front facing 201 and the rear facing 202. Data lines 214 and 224 may not be positioned in a parallel configuration when positioned in close proximity (e.g. 5 millimeters or less), which may reduce inherent magnetic coupling between the antennas and/or associated components.

Referring to FIG. 4, which may be a perspective MN 200 front facing 201, MN 200 may comprise a common ground trace 230. Common ground trace 230 may be positioned on, and/or embedded in, the MN front facing 201 as shown in FIG. 4. For example, MN 200 may comprise a printed circuit board positioned between the front facing 201 and the rear facing 202, and the common ground trace 230 may be positioned on the printed circuit board. Common ground trace 230 may connect to ground traces 216 and 226. Common ground trace 230 may be connected to a MN 200 which may act as a ground, for example to a casing of MN 200. As discussed above, antennas 210 and 220 and/or data lines 214 and 224, respectively, may become magnetically coupled during use due to their proximity. Such coupling may result in reduced signal isolation and reduced radiation efficiency. Common ground trace 230 may short the data lines 214 and 224, which may reduce magnetic coupling allowing for increased signal isolation and increased radiation efficiency. The position of ground traces 216, 226, and 230 may cause current passing through the ground traces 216, 226, and 230 to move in loops in a horizontal plane parallel with the front facing 201. When viewed from the perspective of the front facing 201, the current loop in ground trace 230 and 226 may move in a clockwise direction, while the current loop in ground trace 230 and 216 may move in a counterclockwise direction (e.g. in opposite directions), respectively (or vice-versa depending on the current flow convention employed). The movement of current in opposite directions may further reduce magnetic coupling between the data lines 214 and 224 and/or the antennas 210 and 220, respectively.

Figure 5:
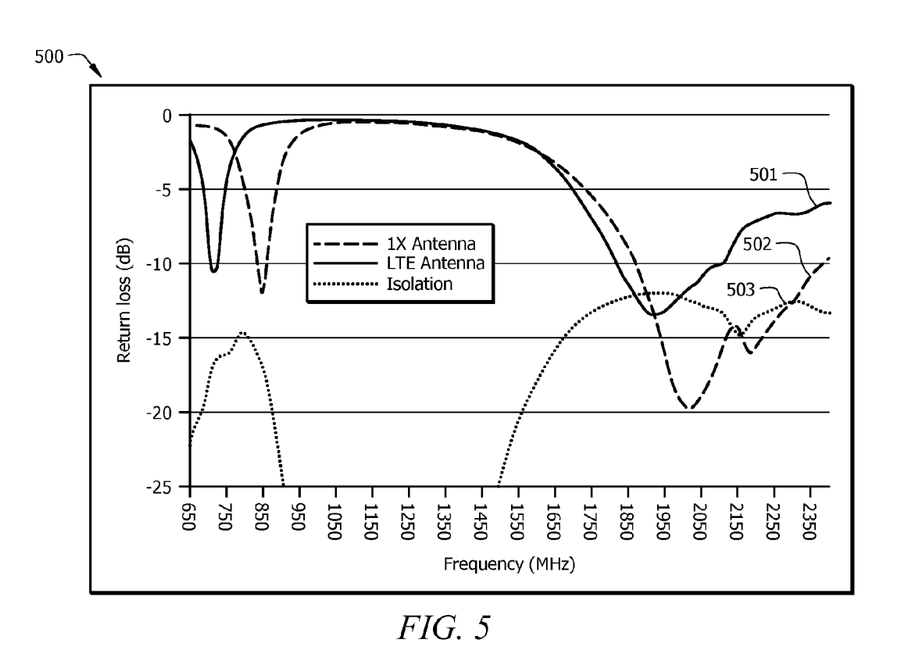
FIG. 5 is a graph of measured signal isolation and return loss of an MN embodiment.

FIG. 5 is a graph 500 of measured signal isolation and return loss of an MN embodiment, such as MN 200. Return loss may be a measurement of power reflected by an antenna compared to power input into the antenna. Signal isolation may be a measurement of radiation traveling to from a first antenna to a second antenna. Graph 500 may comprise LTE antenna return loss 501 (e.g. for antenna 210), 1× antenna return loss 502 (e.g. for antenna 220), and signal isolation 503. Return loss may be a loss of wireless signal power measured in decibels (dB). Graph 500 may display return loss as negative values with greater negative values being more desirable (e.g. greater power transfer is more negative). For purposes of clarity, data in graph 500 shall be considered in terms of absolute value so that the term less shall refer to smaller numbers and more shall refer to larger numbers, respectively. Signal isolation may be a power transfer between antennas measured in dB. Graph 500 may display isolation as negative values with greater negative values being desirable (e.g. lower isolation values may indicate less power transference between antennas). Return loss 501 for antenna 210 may range from about −11 dBs or less over a frequency range of about 650 MHz to about 850 MHz and about −13 dBs or less over a frequency range of about 1450 MHz to about 2350 MHz. Return loss 502 for antenna 220 may range from about −12 dBs or less over a frequency range of about 650 MHz to about 850 MHz and about −20 dBs or less over a frequency range of about 1450 MHz to about 2350 MHz.

Signal isolation 503 between antennas 220 and 210 may remain at about −15 dBs or more over a frequency range of about 650 MHz to about 900 MHz, and about −12 dB or more over a frequency range of about 1500 MHz to about 2350 MHz. Graph 500 may indicate that MN 200 may simultaneously transmit network data from antenna 210 and voice data from antenna 220 over a range of frequencies of about 650 MHz to about 2350 MHz while maintaining a signal isolation of below −10 dB. An isolation of below −10 dB may indicate that associated signals experience minimal coupling, which may result in improved radiation efficiency for one or both antennas.

Figure 6:
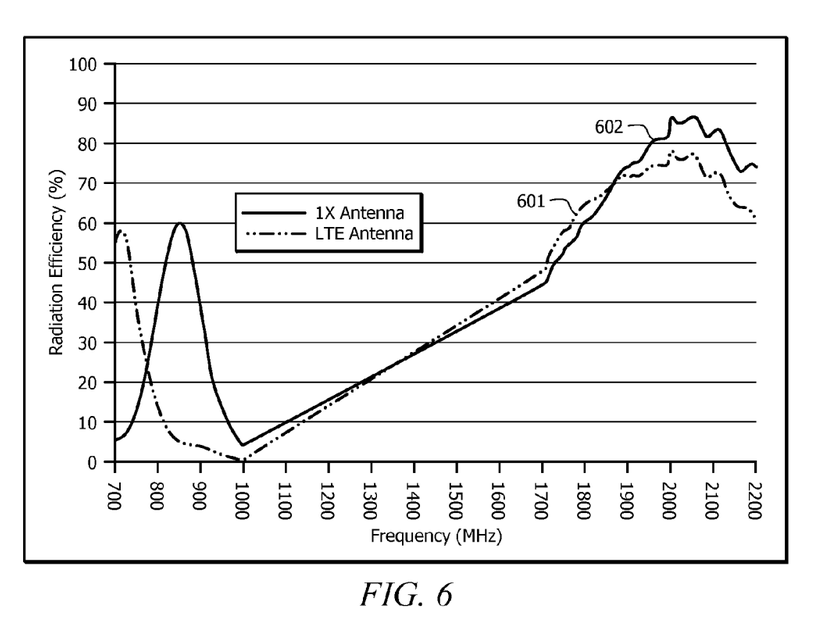
FIG. 6 is a graph of measured radiation efficiency of an embodiment of an MN embodiment.

FIG. 6 is a graph 600 of measured radiation efficiency of an MN embodiment, such as MN 200. Radiation efficiency may be the ratio of power transmitted by an antenna to the power received by that antenna from a transmitter (e.g. Tx 132). Graph 600 may comprise LTE antenna radiation efficiency 601 (e.g. for antenna 210) and 1× antenna radiation efficiency 602 (e.g. for antenna 220). Graph 600 may indicate that MN 200 may efficiently simultaneously convert electric signals to wireless signals via antennas 210 and 220 over frequency ranges as shown.

Figure 7:
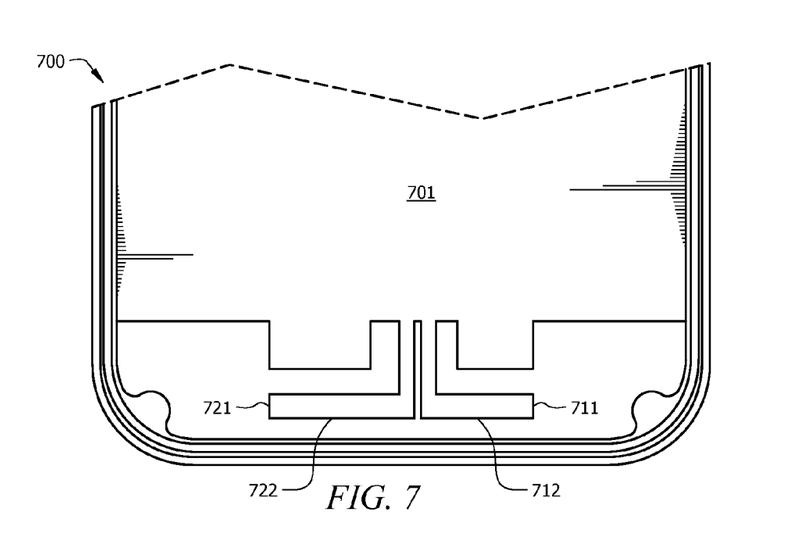
FIG. 7 is a schematic diagram of another embodiment of MN antenna ground traces.

FIG. 7 is a schematic diagram of another embodiment of MN 700 antenna ground traces. MN 700 may be substantially similar to MN 200 and/or 100, but may comprise ground traces 712 and 722 instead of common ground trace 230. Ground traces 712 and 722 may be electrically coupled to ground traces 711 and 721, respectively. Ground trace 711 may be coupled to an LTE antenna via a data line in substantially the same manner as ground trace 216. Ground trace 721 may be coupled to a 1× antenna via a data line in substantially the same manner as ground trace 226. Ground traces 712 and 722 may be positioned on, and/or embedded in, an MN front facing and/or be positioned on a printed circuit board.

Ground traces 712 and 722 may be positioned substantially between the data lines in reference to a plane parallel to a front facing of MN 700. As shown in FIG. 7, a portion of ground trace 712 may be substantially parallel to a portion of ground trace 722. Ground traces 712 and 722 may be magnetically coupled, but may not be electrically shorted. The parallel portions of the ground traces may be separated by a distance of about five millimeters or less, a distance of less than about 0.5 millimeters, a distance in a range of about five millimeters to about two millimeters, a range of about two millimeters to about 0.5 millimeters, a range of about five millimeters to about 0.1 millimeters, a range of about two millimeters to about 0.1 millimeters, or combinations thereof. The position of ground traces 711, 712, 721, and 722 may cause current passing through the ground traces 711, 712, 721, and 722 to move in loops in a horizontal plane parallel with a front facing 701 of MN 700. When viewed from the perspective of the front facing, the current loop in ground traces 711 and 712 may move in a clockwise direction, while the current loop in ground traces 721 and 722 may move in a counterclockwise direction (e.g. in opposite directions), respectively (or vice-versa depending on the current flow convention employed). The movement of current in opposite directions may further reduce magnetic coupling between the data lines and/or antennas, which may be substantially similar to data lines 214 and 224 and/or the antennas 210 and 220, respectively.

Figure 8:
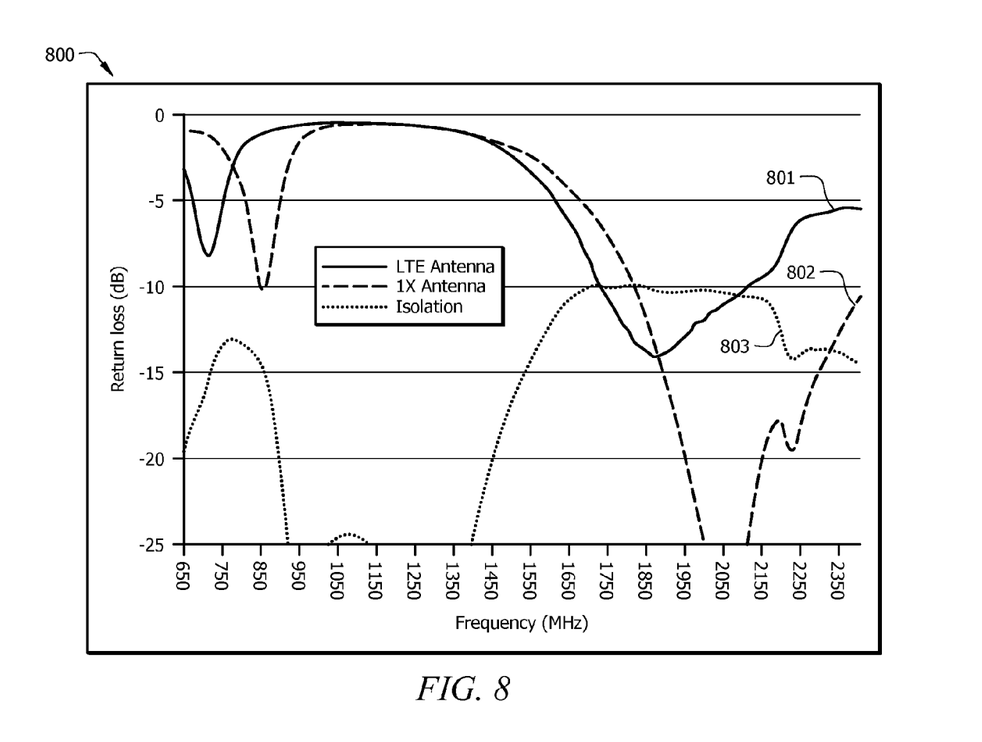
FIG. 8 is a graph of measured signal isolation and return loss of an MN embodiment.

FIG. 8 is a graph 800 of measured signal isolation and return loss of an MN embodiment. Graph 800 may be similar to graph 500, but may comprise LTE antenna return loss 801 (e.g. for an LTE antenna substantially similar to antenna 210 with ground trace 711), 1× antenna return loss 802 (e.g. for a 1× antenna substantially similar to antenna 220 with ground trace 721), and signal isolation 803. Return loss 801 for the LTE antenna with ground trace 711 may range from about −8 dBs or less over a frequency range of about 650 MHz to about 850 MHz and about −14 dBs or less over a frequency range of about 1450 MHz to about 2350 MHz. Return loss 802 for the 1× antenna with ground trace 721 may range from about −10 dBs or less over a frequency range of about 650 MHz to about 950 MHz and about −25 dBs or less over a frequency range of about 1450 MHz to about 2350 MHz. Signal isolation 803 between the LTE antenna with ground trace 711 and the 1× antenna with ground trace 721 may be about −13 dBs or more over a frequency range of about 650 MHz to about 900 MHz and about −10 dB or more over a frequency range of about 1400 MHz to about 2350 MHz. Graph 800 may indicate that MN 700 may simultaneously transmit network data from an antenna, such as antenna 210, and voice data from antenna, such as antenna 220, over a range of frequencies of about 650 MHz to about 2350 MHz while maintaining a signal isolation of below −10 dB. An isolation of below −10 dB may indicate that associated signals experience minimal coupling, which may result in improved radiation efficiency for one or both antennas.

Figure 9:
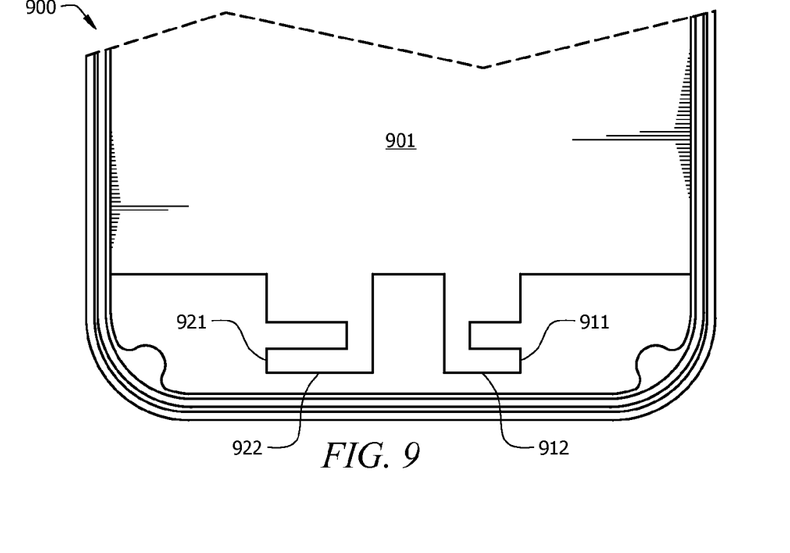
FIG. 9 is a schematic diagram of another embodiment of MN antenna ground traces.

FIG. 9 is a schematic diagram of another embodiment of MN 900 antenna ground traces. MN 900 may be substantially similar to MN 700, but may comprise ground traces 912 and 922 instead of ground traces 712 and 722. Ground traces 912 and 922 may be electrically coupled to ground traces 911 and 921, respectively. Ground trace 911 may be coupled to an LTE antenna via a data line in substantially the same manner as ground trace 711. Ground trace 921 may be coupled to a 1× antenna via a data line in substantially the same manner as ground trace 721. Ground traces 912 and 922 may be positioned on, and/or embedded in, an MN front facing and/or be positioned on a printed circuit board.

Ground traces 912 and 922 may be positioned substantially between the data lines in reference to a plane parallel to a front facing of MN 900. As shown in FIG. 9, a portion of ground race 912 may be substantially parallel to a portion of ground trace 922. The parallel portions of the ground traces may be separated by a distance of more than about five millimeters. Ground traces 912 and 922 may be magnetically coupled, but may be less magnetically coupled than ground traces 712 and 722 because of the increased separation. The position of ground traces 911, 912, 921, and 922 may cause current passing through the ground traces 911, 912, 921, and 922 to move in loops in a horizontal plane parallel with a front facing 901 of MN 900, in substantially the same manner as MN 700. When viewed from the perspective of the front facing, the current loop in ground traces 911 and 912 may move in a clockwise direction, while the current loop in ground traces 921 and 922 may move in a counterclockwise direction (e.g. in opposite directions), respectively (or vice-versa depending on the current flow convention employed).

Figure 10:
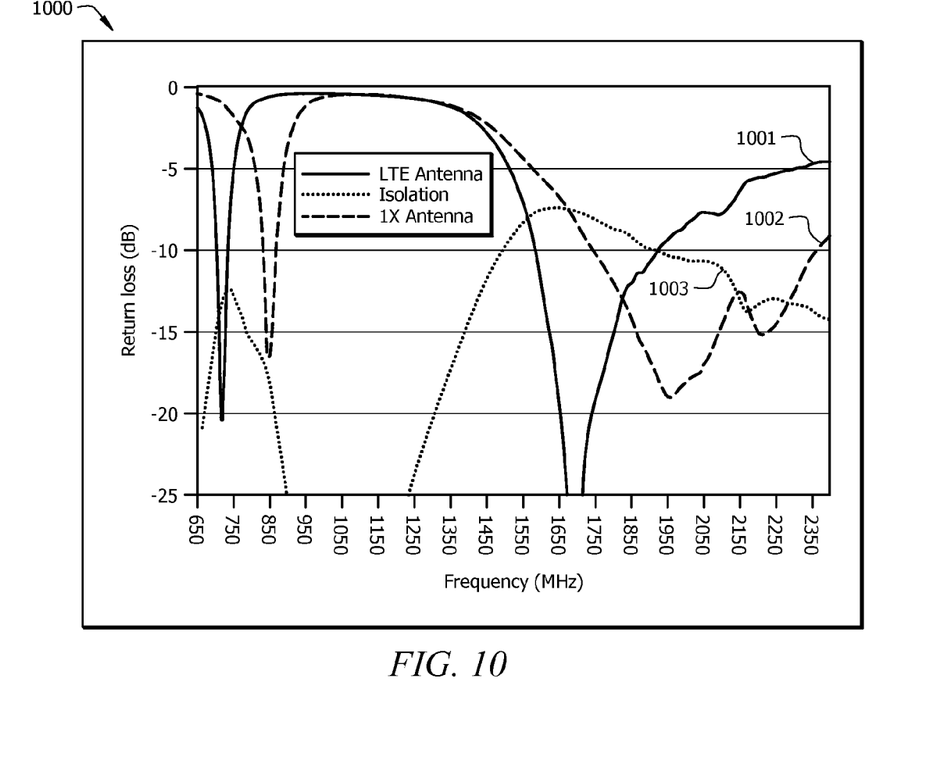
FIG. 10 is a graph of measured signal isolation and return loss of an MN embodiment.

FIG. 10 is a graph 1000 of measured signal isolation and return loss of an MN embodiment. Graph 1000 may comprise LTE antenna return loss 1001 (e.g. for an LTE antenna substantially similar to antenna 210 with ground trace 911), 1× antenna return loss 1002 (e.g. for a 1× antenna substantially similar to antenna 220 with ground trace 921), and signal isolation 1003. Return loss 1001 for the LTE antenna with ground trace 911 may range from about zero to less than −20 dB across a range of frequencies extending from about 650 MHz to about 2350 MHz. Return loss 1002 for the 1× antenna with ground trace 921 may range from about zero to about −18 dB across a range of frequencies extending from about 650 MHz to about 2350 MHz. Signal isolation 1003 between the LTE antenna with ground trace 911 and the 1× antenna with ground trace 921 may remain below −10 dB across a range of frequencies extending from about 650 MHz to about 1500 MHz and about 1950 MHz to about 2350 MHz. However, signal isolation may exceed −10 db across a range of frequencies extending from about 1500 MHz to about 1950 MHz. Graph 1000 may indicate that MN 900 may simultaneously transmit network data from an antenna, such as antenna 210, and voice data from antenna, such as antenna 220, over a range of frequencies of about 650 MHz to about 2350 MHz. However, signal isolation of greater than −10 dB may occur over the frequency range of about 1500 MHz to about 1950 MHz, which may be undesirable for some applications.

Figure 11:
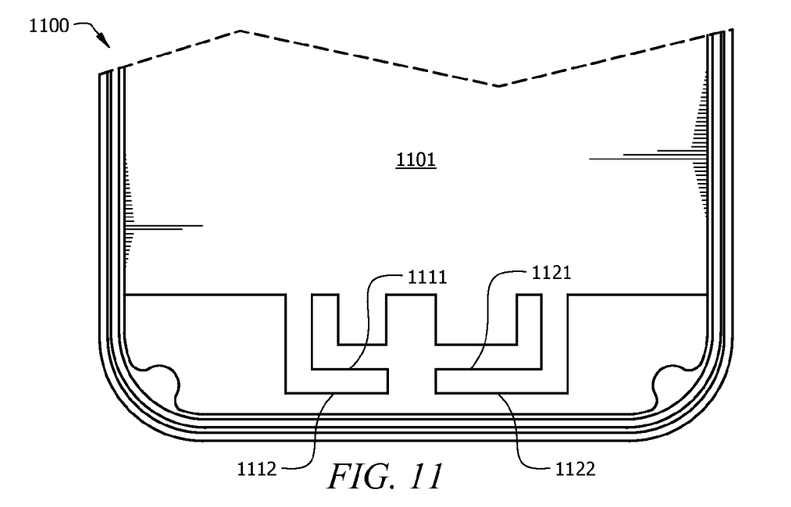
FIG. 11 is a schematic diagram of another embodiment of MN antenna ground traces.

FIG. 11 is a schematic diagram of another embodiment of MN 1100 antenna ground traces. MN 1100 may be substantially similar to MN 700 and/or 900, but may comprise ground traces 1112 and 1122. Ground traces 1112 and 1122 may be electrically coupled to ground traces 1111 and 1121, respectively. Ground trace 1111 may be coupled to an LTE antenna via a data line in substantially the same manner as ground traces 711 and/or 911. Ground trace 1121 may be coupled to a 1× antenna via a data line in substantially the same manner as ground trace 721 and/or 921. Ground traces 1112 and 1122 may be positioned on, and/or embedded in, an MN front facing and/or be positioned on a printed circuit board.

Ground traces 1112 and 1122 may connect to ground traces 1111 and 1121, respectively, near the MN 1100 center line and extend toward the outer edge of MN 1100. Ground traces 1112 and 1122 may not be positioned substantially between the data lines in reference to a plane parallel to a front facing of MN 1100. A portion of ground trace 1112 may be substantially parallel to a portion of ground trace 1122. The parallel portions of the ground traces may be separated by a distance of about fifteen millimeters or more. Ground traces 1112 and 1122 may be magnetically coupled, but may be less magnetically coupled than ground traces 912 and 922 because of the increased separation. The position of ground traces 1111, 1112, 1121, and 1122 may cause current passing through the ground traces 1111, 1112, 1121, and 1122 to move in loops in a horizontal plane parallel with a front facing 1101 of MN 1100. When viewed from the perspective of the front facing, the current loop in ground traces 1111 and 1112 may move in a counterclockwise direction, while the current loop in ground traces 1121 and 1122 may move in a clockwise direction (e.g. in opposite directions), respectively (or vice-versa depending on the current flow convention employed).

Figure 12:
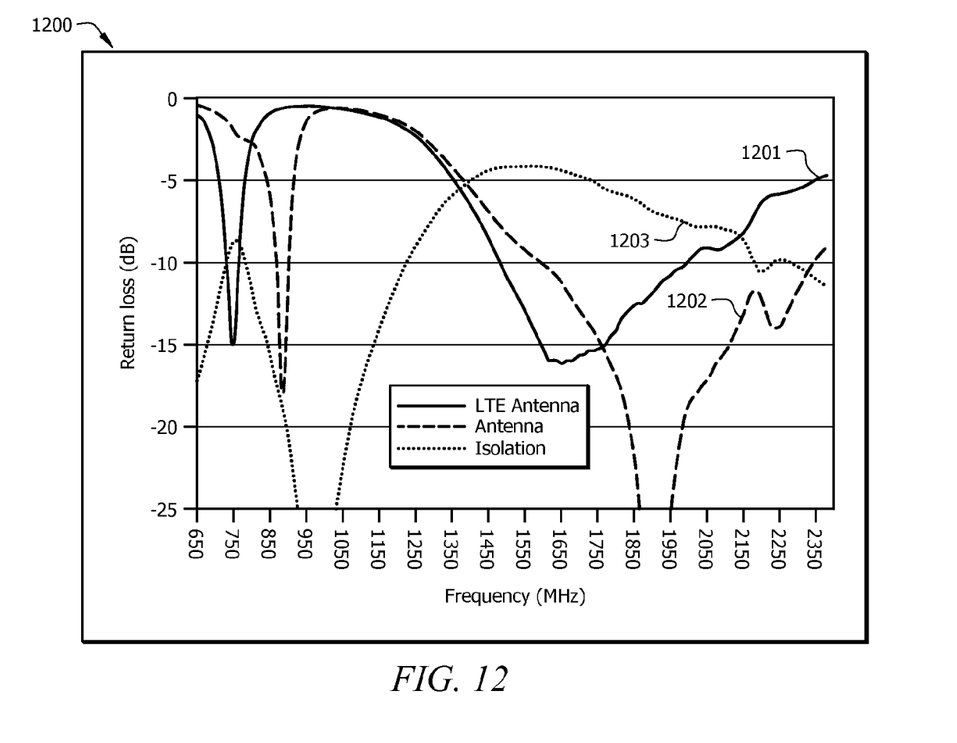
FIG. 12 is a graph of measured signal isolation and return loss of an MN embodiment.

FIG. 12 is a graph 1200 of measured signal isolation and return loss of an MN embodiment. Graph 1200 may comprise LTE antenna return loss 1201 (e.g. for an LTE antenna substantially similar to antenna 210 with ground trace 1111), 1× antenna return loss 1202 (e.g. for a 1× antenna substantially similar to antenna 220 with ground trace 1121), and signal isolation 1203. Return loss 1201 for the LTE antenna with ground trace 1111 may range from about zero to less than −16 dB across a range of frequencies extending from about 650 MHz to about 2350 MHz. Return loss 1202 for the 1× antenna with ground trace 1121 may range from about zero to less than −25 dB across a range of frequencies extending from about 650 MHz to about 2350 MHz. Signal isolation 1203 between the LTE antenna with ground trace 1111 and the 1× antenna with ground trace 1121 may exceed −10 dB across a range of frequencies extending from about 730 MHz to about 760 MHz and a range extending from about 1375 MHz to about 2200 MHz. Graph 1200 may indicate that MN 1100 may simultaneously transmit network data from an antenna, such as antenna 210, and voice data from antenna, such as antenna 220, over a range of frequencies of about 650 MHz to about 2350 MHz. However, signal isolation of greater than −10 dB may occur over the frequency ranges of about 730 MHz to about 760 MHz and about 1375 MHz to about 2200 MHz, which may be undesirable for some applications.

Figure 13:
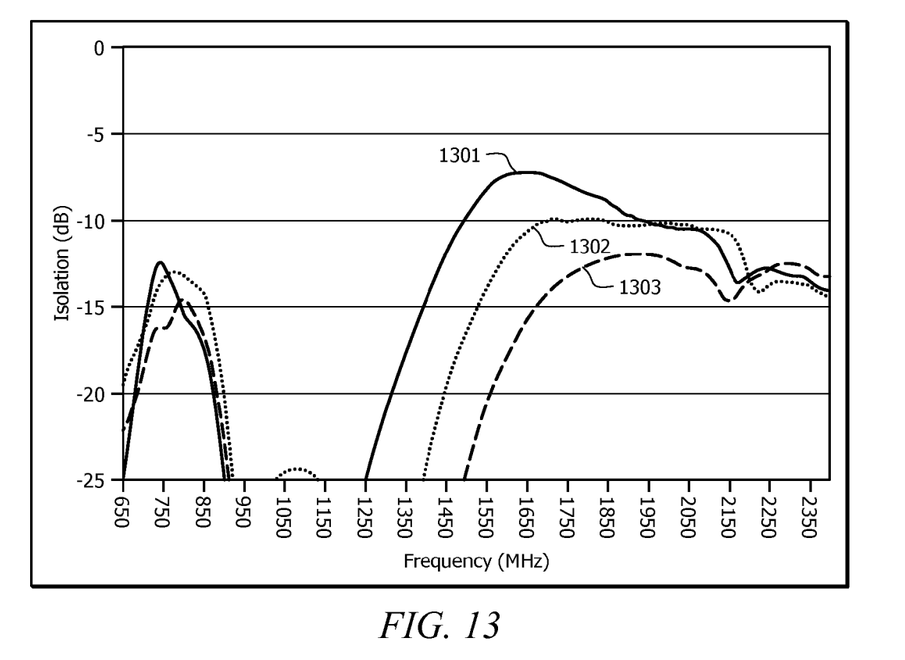
FIG. 13 a graph of measured signal isolations for multiple MN embodiments.

FIG. 13 a graph 1300 of measured signal isolations for multiple MN embodiments. Graph 1300 may compare signal isolation 1301, 1302, and 1303 for MN 900, MN 700, and MN 200, respectively. As shown by graph 1300, MN 200 may exhibit the lowest signal isolation of the MN embodiments over most of a frequency range of about 650 MHz to about 2350 MHz. MN 700 and MN 900 may exhibit signal isolation that is comparable over a frequency range of about 650 MHz to about 1250 MHz and a frequency range of about 1950 MHz to about 2350 MHz. MN 700 may exhibit a lower signal isolation than MN 900 over a frequency range of about 1250 MHz to about 1950 MHz. Graph 1300 may also indicate that MN 900 exhibit a signal isolation above −10 dB over the frequency range of about 1500 MHz to about 1950 MHz, which may be undesirable for some applications.

Figure 14:
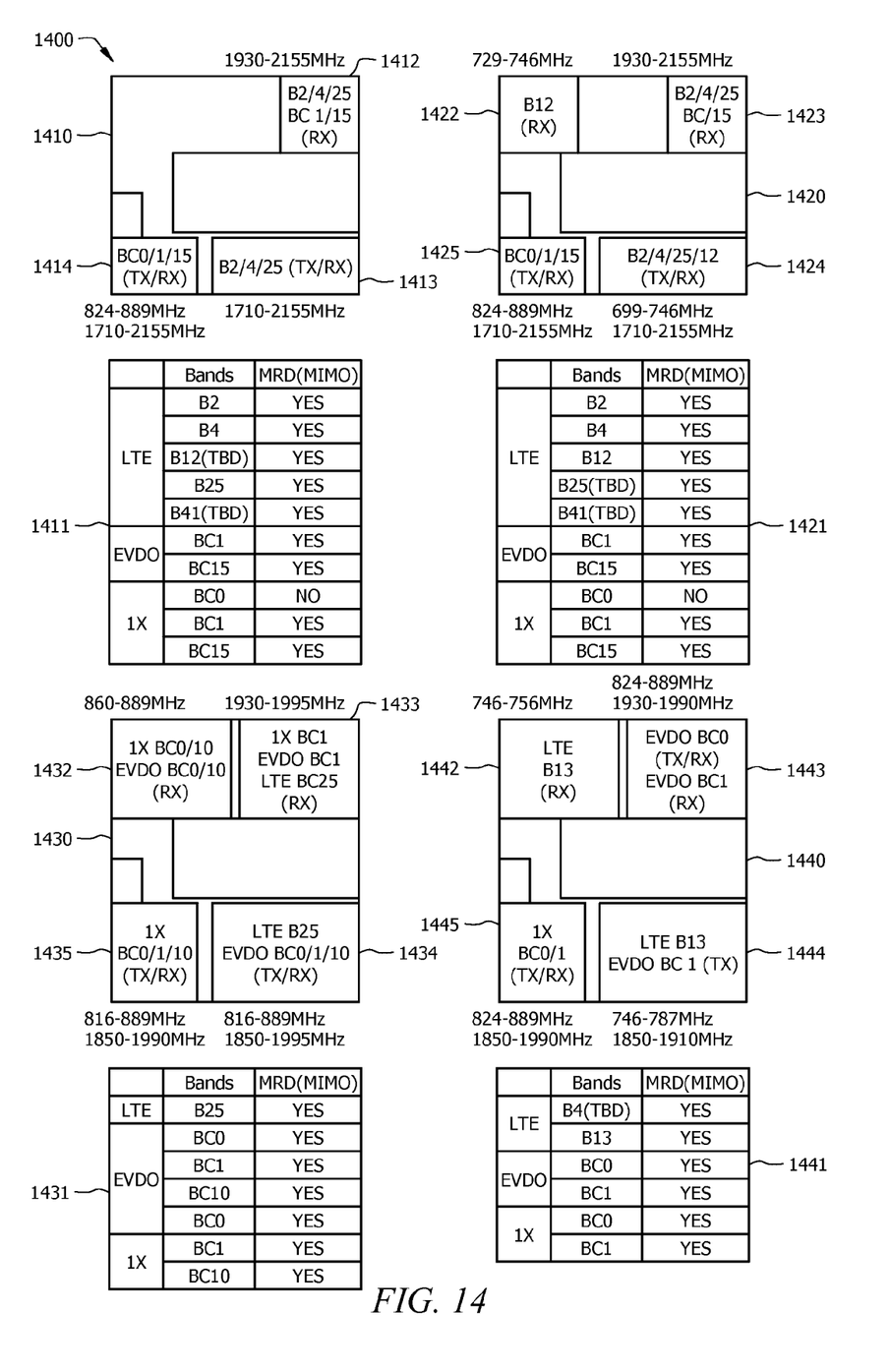
FIG. 14 is a schematic diagram of MN antenna positions and specifications.

FIG. 14 is a schematic diagram 1400 of MN antenna positions and specifications. MN 1410 may comprise an LTE/EVDO receiver antenna 1412 positioned at the top of MN 1410, LTE transceiver antenna 1413 positioned at the bottom of MN 1410, and 1×/EVDO transceiver antenna 1414 positioned at the bottom of MN 1410. Antenna 1412 may receive data on LTE frequency bands two, four, and twenty five and EVDO band one. Antenna 1413 may receive and transmit data on LTE bands two, four, and twenty five. Antenna 1414 may receive and transmit data on 1×/EVDO bands zero, one, and fifteen. Graph 1411 may indicate the technology associated with each frequency band and whether the antenna(s) associated with those bands support Mobile Receive Diversity (MRD) and Multiple Input and Multiple Output (MIMO).

MN 1420 may comprise LTE receiver antenna 1422 and LTE/EVDO receiver antenna 1423 positioned at the top of MN 1420 and LTE transceiver antenna 1424 and 1×/EVDO transceiver antenna 1425 positioned at the bottom of MN 1420. Antenna 1422 may receive data on LTE frequency band twelve. Antenna 1423 may receive data on LTE frequency bands two, four, and twenty five and EVDO frequency band fifteen. Antenna 1424 may receive and transmit data on LTE bands two, four, twelve, and twenty five. Antenna 1425 may receive and transmit data on 1×/EVDO bands zero, one, and fifteen. Graph 1421 may indicate data associated with MN 1420 and may comprise substantially the same type of data as graph 1411.

MN 1430 may comprise 1×/EVDO receiver antenna 1432 and LTE/1×/EVDO receiver antenna 1433 positioned at the top of MN 1430 and LTE/EVDO transceiver antenna 1434 and 1× transceiver antenna 1435 positioned at the bottom of MN 1430. Antenna 1432 may receive data on 1× frequency bands zero and ten and EVDO bands zero and ten. Antenna 1433 may receive data on LTE band twenty five, EVDO band one, and 1× band one. Antenna 1434 may receive and transmit data on LTE band twenty five and EVDO bands zero, one, and ten. Antenna 1435 may receive and transmit data on 1× bands zero, one, and ten. Graph 1431 may indicate data associated with MN 1430 and may comprise substantially the same type of data as graphs 1411 and 1421.

MN 1440 may comprise LTE receiver antenna 1442 and EVDO transceiver antenna 1443 positioned at the top of MN 1440 and LTE/EVDO transmitter antenna 1444 and 1× transceiver antenna 1445 positioned at the bottom of MN 1440. Antenna 1442 may receive data on LTE frequency band thirteen. Antenna 1443 may receive and transmit data on EVDO band zero and receive data on EVDO band one. Antenna 1444 may transmit data on LTE band thirteen and EVDO band one. Antenna 1445 may receive and transmit data on 1× bands zero and one. Graph 1441 may indicate data associated with MN 1440 and may comprise substantially the same type of data as graphs 1411, 1421, and 1431.

It is understood that by programming and/or loading executable instructions onto the MN 200 and/or 700, at least one of the processor 120, memory 121-123, and/or Rx/Tx 112/132 are changed, transforming the MN 200 and/or 700 in part into a particular machine or apparatus, e.g., a signaling device having novel isolation characteristics. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 5, 4, etc.; greater than 0.10 includes 0.11, 0.12, 0.15, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 5 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. The use of the term about means±10% of the subsequent number, unless otherwise stated. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A mobile node (MN) comprising:
    a first antenna configured to communicate with a wireless network;
    a second antenna configured to communicate with a wireless network;
    a first data line coupled to the first antenna and a common ground;
    a second data line coupled to the second antenna and the common ground; and
    a common ground trace coupled directly to the first antenna, the second antenna, and the common ground,
    wherein the first antenna and the second antenna are not directly connected to each other.

2. The MN of claim 1, wherein the MN is configured to simultaneously transmit voice data, network data, or combinations thereof via the first antenna and the second antenna.

3. The MN of claim 2, wherein the first antenna and the second antenna maintain a signal isolation of about −15 decibels (dBs) or more over a frequency range of about 650 Megahertz (MHz) to about 900 MHz, and wherein the first antenna and the second antenna maintain a signal isolation of about −12 dB or more over a frequency range of about 1500 MHz to about 2350 MHz.

4. The MN of claim 2, wherein the first antenna maintains a return loss of about −11 decibels (dBs) or less over a frequency range of about 650 Megahertz (MHz) to about 850 MHz, and wherein the first antenna maintains a return loss of about −13 dBs or less over a frequency range of about 1450 MHz to about 2350 MHz.

5. The MN of claim 2, wherein the second antenna maintains a return loss of about −12 decibels (dBs) or less over a frequency range of about 650 Megahertz (MHz) to about 850 MHz, and wherein the second antenna maintains a return loss of about −20 dBs or less over a frequency range of about 1450 MHz to about 2350 MHz.

6. The MN of claim 1, wherein the MN has a proximate end and a distal end, wherein the first antenna, the second antenna, the first data line, the second data line, and the common ground trace are embedded in the distal end.

7. The MN of claim 6, wherein the MN comprises a front facing and a rear facing, and wherein the first antenna, the second antenna, the first data line, and the second data line are positioned in the rear facing or in the front facing.

8. The MN of claim 7, wherein the first antenna is configured to wirelessly transmit network data, and wherein the second antenna is configured to wirelessly transmit voice data.

9. The MN of claim 8, wherein the first antenna is configured to transmit network data across a frequency range of about 699 MHz to about 750 MHz, about 740 MHz to about 790 MHz, about 1710 MHz to about 2170 MHZ, or combinations thereof.

10. The MN of claim 8, wherein the second antenna is configured to transmit network data across a frequency range of about 820 MHz to about 890 MHz, about 1710 MHz to about 2170 MHz, or combinations thereof.

11. The MN of claim 8, wherein the first antenna and the second antenna are both Planar Inverted F Antennas (PIFAs).

12. The MN of claim 6, wherein the MN comprises a printed circuit board, and wherein the common ground trace is positioned in the printed circuit board or on the printed circuit board.

13. The MN of claim 1, wherein the first data line comprises a proximate end and a distal end, wherein the second data line comprises a proximate end and a distal end, wherein the distal end of the first data line is coupled to the common ground trace, wherein the distal end of the second data line is coupled to the common ground trace, wherein the proximate end of the first data line is coupled to the first antenna, and wherein the proximate end of the second data line is coupled to the second antenna.

14. A mobile node (MN) comprising:
    a first antenna configured to communicate with a wireless network;
    a second antenna configured to communicate with a wireless network;
    a first data line coupled to the first antenna;
    a first ground trace coupled to the first data line;
    a second data line coupled to the second antenna; and
    a second ground trace coupled to the second data line,
    wherein a portion of the first ground trace is substantially parallel to a portion of the second ground trace,
    wherein the ground traces are not electrically shorted, and
    wherein the parallel portions of the ground traces are separated by a distance of about five millimeters or less.

15. The MN of claim 14, wherein the MN is configured to simultaneously transmit data via the first antenna and the second antenna.

16. The MN of claim 15, wherein the first antenna and the second antenna maintain a signal isolation of about −13 decibels (dBs) or more over a frequency range of about 650 Megahertz (MHz) to about 900 MHz, and wherein the first antenna and the second antenna maintain a signal isolation of about −10 dB or more over a frequency range of about 1400 MHz to about 2350 MHz.

17. The MN of claim 15, wherein the first antenna maintains a return loss of about −8 decibels (dBs) or less over a frequency range of about 650 Megahertz (MHz) to about 850

MHz, and wherein the first antenna maintains a return loss of about −14 dBs or less over a frequency range of about 1450 MHz to about 2350 MHz.

18. The MN of claim 15, wherein the second antenna maintains a return loss of about −10 decibels (dBs) or less over a frequency range of about 650 Megahertz (MHz) to about 950 MHz, and wherein the second antenna maintains a return loss of about −25 dBs or less over a frequency range of about 1450 MHz to about 2350 MHz.

19. The MN of claim 14, wherein the ground traces are separated by a distance of about two millimeters to about 0.1 millimeters.

20. The MN of claim 14, wherein the ground traces are separated by a distance of about two millimeters to about five millimeters.

21. The MN of claim 14, wherein the ground traces are separated by a distance of less than about 0.5 millimeters.

22. The MN of claim 14, wherein the MN has a front facing, a rear facing, and comprises a printed circuit board, wherein the first data line, second data line, first antenna, and second antenna are positioned in the rear facing, and wherein the first ground trace and the second ground trace are positioned in the front facing or on the printed circuit board.

23. The MN of claim 22, wherein the ground traces are positioned substantially between the data lines in reference to a plane parallel to the front facing.

24. The MN of claim 23, wherein the first data line comprises a proximate end and a distal end, wherein the second data line comprises a proximate end and a distal end, wherein the distal end of first data line is coupled to the first ground trace, wherein the distal end of second data line is coupled to the second ground trace, wherein the proximate end of the first data line is coupled to the first antenna, and wherein the proximate end of the second data line is coupled to the second antenna.

25. The MN of claim 24, wherein the first antenna is configured to transmit network data to a long term evolution (LTE) network.

* * * * *